United States Patent
Klimke et al.

(10) Patent No.: US 10,804,005 B2
(45) Date of Patent: *Oct. 13, 2020

(54) INSULATION LAYER FOR CABLES

(71) Applicant: Borealis AG, Vienna (AT)

(72) Inventors: Katja Klimke, Linz (AT); Dietrich Gloger, Linz (AT); Markus Gahleitner, Neunhofen/Krems (AT); Davide Tranchida, Linz (AT); James Ellis Robinson, Genval (BE); Ann Watson, Diest (BE)

(73) Assignee: BOREALIS AG (AT)

( * ) Notice: Subject to any disclaimer, the term of this patent is extended or adjusted under 35 U.S.C. 154(b) by 454 days.

This patent is subject to a terminal disclaimer.

(21) Appl. No.: 14/362,997

(22) PCT Filed: Dec. 5, 2012

(86) PCT No.: PCT/EP2012/074438
§ 371 (c)(1),
(2) Date: Jun. 5, 2014

(87) PCT Pub. No.: WO2013/083602
PCT Pub. Date: Jun. 13, 2013

(65) Prior Publication Data
US 2014/0349110 A1 Nov. 27, 2014

(30) Foreign Application Priority Data
Dec. 9, 2011 (EP) .................................. 11192709

(51) Int. Cl.
H01B 3/44 (2006.01)
C08L 23/12 (2006.01)
C08L 23/14 (2006.01)
C08L 23/08 (2006.01)
C08K 5/00 (2006.01)

(52) U.S. Cl.
CPC ................ H01B 3/44 (2013.01); C08L 23/12 (2013.01); C08L 23/14 (2013.01); C08L 23/142 (2013.01); H01B 3/441 (2013.01); C08K 5/0083 (2013.01); C08L 23/0869 (2013.01); Y10T 428/294 (2015.01)

(58) Field of Classification Search
CPC .... C08L 23/12; C08L 23/142; C08L 2666/06; C08L 51/06; C08L 23/0869; C08L 23/14; C08K 5/0083; H01B 3/44; H01B 3/441
See application file for complete search history.

(56) References Cited

U.S. PATENT DOCUMENTS

| | | | | |
|---|---|---|---|---|
| 6,225,366 B1 * | 5/2001 | Raetzsch | ................ | C08J 9/0061 521/134 |
| 2004/0158000 A1 * | 8/2004 | Yada | ....................... | C08L 23/10 525/240 |
| 2004/0242716 A1 * | 12/2004 | Motha | .................... | C08J 9/0061 521/142 |
| 2005/0241820 A1 * | 11/2005 | Wasserman | .......... | G02B 6/4429 166/100 |
| 2007/0004860 A1 * | 1/2007 | Leboeuf | .................. | B32B 27/08 525/70 |
| 2007/0276096 A1 * | 11/2007 | Wefer | .................... | C08F 255/00 525/298 |
| 2008/0023215 A1 | 1/2008 | Uehara et al. | | |
| 2009/0018267 A1 * | 1/2009 | Vestberg | ............... | C08F 110/06 525/52 |
| 2010/0285253 A1 * | 11/2010 | Hughes | .................... | C08F 10/00 428/36.9 |
| 2011/0266027 A1 * | 11/2011 | Pham | ....................... | C08L 23/08 173/113 R |

FOREIGN PATENT DOCUMENTS

| | | |
|---|---|---|
| EP | 2202271 A1 | 6/2010 |
| JP | 02269110 A * | 11/1990 |
| WO | 2010076231 A1 | 7/2010 |

OTHER PUBLICATIONS

JP 02269110 English Abstract.*

* cited by examiner

Primary Examiner — Holly C Rickman
Assistant Examiner — Linda N Chau
(74) Attorney, Agent, or Firm — Tarolli, Sundheim, Covell and Tummino LLP

(57) ABSTRACT

The present invention is directed to a new cable having at least one insulation layer, to a process for producing such cable as well as to the use of a soluble a-nucleating agent (NA) for increasing the crystallization temperature of a polymer composition (PC) being part of an insulation layer of such a cable and the use of such a cable as communication cable and/or electrical cable.

7 Claims, No Drawings

INSULATION LAYER FOR CABLES

The present invention is directed to a new cable having at least one insulation layer, to a process for producing such cable as well as to the use of a soluble α-nucleating agent (NA) for increasing the crystallization temperature of a polymer composition (PC) being part of an insulation layer of a cable and the use of such a cable as communication cable and/or electrical cable.

Today, polyethylene is used as the material of choice for insulative and semiconductive layers in cables due to the ease of processing and the beneficial electrical properties. For power cables the polymers, preferably low density polyethylene, are crosslinked in order to assure good operating properties at the required operating temperature (90° C.). A drawback of such crosslinked polyethylene materials is the remaining crystalline fraction of the polyethylene which melts at about 110° C. This means that at the emergency temperature (~135° C.) the material might create some problems. Another drawback is the lack of recyclability of such crosslinked insulation materials. For communication cables high density polyethylene is used in non-crosslinked form, again limiting the heat resistance but also the twistability because of the limited stiffness of this material.

Nowadays attempts are undertaken to replace known cable layers based on polyethylene by cable layers based on polypropylene offering advantages in both heat resistance and stiffness. Various polypropylene types have been suggested tailored for individual purposes.

For instance EP 1 619 217 A1 provides a cable layer of a heterophasic propylene polymer with good results with regard to softness and toughness, even though the toughness at low temperatures could be still improved. However, the polymer cannot be extruded at high line speeds. High line speeds, however, are highly appreciated from a commercial point of view.

EP 0 893 801 A1 discloses propylene polymer components suitable as insulation sheet material. It particularly discloses a polymer composition (PC) of a crystalline propylene homopolymer or copolymer mixed with a copolymer of ethylene with an α-olefin having a low density and a high structural uniformity, in particular having a highly homogeneous distribution of the α-olefin between the polymer molecules. However, EP 0 893 801 A1 does not disclose a possibility of having an insulation layer suitable for high temperature operation conditions, while simultaneously having very good mechanical and process properties.

Even though the use of polypropylene in insulation layers is known, there is still the need to improve the data transmission quality by tighter twisting. Additionally, the insulation layer being part of the cable should be possible to be run at present polyethylene extrusion line speeds (1000 to 1500 m/min) or faster without compromising eccentricity, surface quality, strip force and long-term stability of the resulting cable. However, polypropylene exhibits both a lower melting flux at comparable screw speed (see E. E. Stangland et al, Proc. SPE ANTEC 2002, Volume 1: Processing, Paper No. 448) requiring higher processing temperatures and a lower crystallization rate limiting the processing speed compared to polyethylene. Therefore, a combination of the aforementioned requirements is a challenge in developing new cables.

Thus, there is still a need for new cables based on polypropylene. There is in particular the need for cables which can be easily produced, i.e. have a higher crystallization temperature, and, simultaneously provide a high data transmission quality paired with a high stiffness or surface hardness.

The foregoing and other objectives are solved by the subject-matter of the present invention. Advantageous embodiments of the inventive method are defined in the corresponding sub-claims.

The present invention is based on the specific finding that this object can be solved by an insulation layer being part of a cable comprising a crystalline polypropylene (PP) homo- or copolymer being nucleated by a specific nucleating agent (NA).

According to a first aspect of the present invention, a cable having at least one insulation layer is provided, wherein the insulation layer comprises a polymer composition (PC) consisting of (a) at least 94 wt.-%, based on the total weight of the polymer composition (PC), of a crystalline polypropylene (PP) homo- or copolymer having a melt flow rate according to ISO 1133 (230° C./2.16 kg) in the range of 1 g/10 min to 10 g/10 min and a comonomer content of below 5 wt.-%, the comonomers are ethylene and/or a $C_4$ to $C_{10}$ α-olefin, (b) 0.5 wt.-% to 5 wt.-%, based on the total weight of the polymer composition (PC), of an adhesion promoter (AP) being a polar modified polypropylene (PM-PP) homo- or copolymer, and (c) 0.02 wt.-% to 1 wt.-%, based on the total weight of the polymer composition (PC), of a soluble α-nucleating agent (NA).

The inventors surprisingly found that the foregoing product according to the present invention can be easily produced and provides a high data transmission quality paired with a high stiffness or surface hardness. More precisely, the inventors found that such a cable can be obtained if the insulation layer being part of the cable comprises an effectively nucleated polypropylene (PP) homo- or copolymer.

Another aspect of the present invention is directed to a process for producing such a cable, wherein the process comprises the steps of:

(a) forming a polymer composition (PC), (b) applying the polymer composition (PC) of step a) at a melt temperature of 180° C. to 280° C. on a conductor to form an insulation layer, and (c) producing the cable at a processing speed of 300 m/min to 3000 m/min.

It is preferred that the conductor is pre-heated to a temperature between 50° C. and 150° C.

A further aspect of the present invention is directed to the use of a soluble α-nucleating agent (NA) for increasing the crystallization temperature of such a polymer composition (PC) in a cable, wherein the soluble α-nucleating agent (NA) is selected from the group consisting of sorbitol derivatives, nonitol derivatives, benzene-trisamides and mixtures thereof.

A still further aspect of the present invention is directed to the use of such a cable as communication cable and/or electrical cable.

When in the following reference is made to preferred embodiments or technical details of the inventive cable, it is to be understood that these preferred embodiments or technical details also refer to the inventive process for producing the cable, the inventive use of the soluble α-nucleating agent (NA) as well as the inventive use of the cable as communication cable and/or electrical cable. If, for example, it is set out that the inventive insulation layer of the cable preferably comprises a polymer composition (PC) comprising a crystalline polypropylene (PP) homo- or copolymer having a melt flow rate according to ISO 1133 (230° C./2.16 kg) in the range of 1 g/10 min to 10 g/10 min, also the polymer composition (PC) provided in the inventive process as well as the inventive uses preferably comprise a polymer composition (PC) comprising a crystalline polypropylene (PP) homo- or copolymer having a melt flow rate according to ISO 1133 (230° C./2.16 kg) in the range of 1 g/10 min to 10 g/10 min.

According to one preferred embodiment of the present invention, the crystalline polypropylene (PP) homo- or copolymer has (a) a melt flow rate according to ISO 1133 (230° C./2.16 kg) in the range of 1 g/10 min to 8 g/10 min, more preferably in the range of 1 g/10 min to 6 g/10 min and most preferably in the range of 1 g/10 min to 4 g/10 min, and/or (b) a melting temperature Tm as determined by differential scanning calorimetry (DSC) in the range of 140° C. to 175° C., more preferably in the range of 145° C. to 170° C. and most preferably in the range of 148° C. to 168° C., and/or (c) a crystallization temperature Tc as determined by differential scanning calorimetry (DSC) in the range of 105° C. to 140° C., preferably in the range of 110° C. to 135° C. and most preferably in the range of 112° C. to 130° C.

According to another preferred embodiment of the present invention, the polymer composition (PC) has a Shore D hardness from 63 to 80, preferably from 65 to 78.

According to yet another preferred embodiment of the present invention, the polymer composition (PC) has a content of a fraction soluble in xylene at 25° C. from 0.5 wt.-% to 8.5 wt.-%, preferably from 1.0 wt.-% to 7.0 wt.-% and most preferably from 1.0 wt.-% to 6.5 wt.-%, based on the total weight of the polymer composition (PC).

According to one preferred embodiment of the present invention, the polymer composition (PC) has a melting temperature Tm as determined by differential scanning calorimetry (DSC) in the range of 140° C. to 175° C., more preferably in the range of 145° C. to 170° C. and most preferably in the range of 148° C. to 168° C.

According to another preferred embodiment of the present invention, the polymer composition (PC) has a crystallization temperature Tc as determined by differential scanning calorimetry (DSC) in the range of 105° C. to 140° C., preferably in the range of 110° C. to 135° C., most preferably in the range of 112° C. to 130° C.

According to yet another preferred embodiment of the present invention, the crystalline polypropylene (PP) homo- or copolymer is a polypropylene homopolymer (H-PP). Preferably, the polymer composition (PC) has (a) a melt flow rate according to ISO 1133 (230° C./2.16 kg) in the range of 1.0 g/10 min and 8.0 g/10 min, preferably in the range of 1.2 g/10 min and 6.0 g/10 min, more preferably in the range of 1.5 g/10 min and 5.0 g/10 min and most preferably in the range of 2.0 g/10 min and 3.5 g/10 min, and/or (b) a melting temperature Tm as determined by differential scanning calorimetry (DSC) in the range of 150° C. to 175° C., more preferably in the range of 155° C. to 170° C. and most preferably in the range of 160° C. to 168° C., and/or (c) a Shore D hardness from 65 to 80, preferably from 67 to 78 and most preferably from 68 to 75.

According to one preferred embodiment of the present invention, the crystalline polypropylene (PP) homo- or copolymer is a polypropylene copolymer (C-PP), preferably a random polypropylene copolymer (R-PP). Preferably, the polymer composition (PC) has (a) a melt flow rate according to ISO 1133 (230° C./2.16 kg) in the range of 1.0 g/10 min and 8.0 g/10 min, preferably in the range of 1.2 g/10 min and 6.0 g/10 min, more preferably in the range of 1.5 g/10 min and 5.0 g/10 min and most preferably in the range of 2.0 g/10 min and 3.5 g/10 min, and/or (b) a comonomer content between 0.1 wt.-% and 5 wt.-%, preferably between 0.5 wt.-% and 4.0 wt.-%, more preferably between 0.5 wt.-% and 3.5 wt.-% and most preferably between 1.0 wt.-% and 3.0 wt.-%, based on the total weight of the polymer composition (PC), the comonomers are ethylene and/or a $C_4$ to $C_{10}$ α-olefin, and/or (c) a melting temperature Tm as determined by differential scanning calorimetry (DSC) in the range of 140° C. to 165° C., more preferably in the range of 145° C. to 162° C. and most preferably in the range of 150° C. to 160° C., and/or (d) a Shore D hardness from 63 to 77, preferably from 64 to 75, more preferably from 65 to 72 and most preferably from 65 to 70.

According to another preferred embodiment of the present invention, the soluble α-nucleating agent (NA) is (a) selected from the group consisting of sorbitol derivatives, nonitol derivatives, benzene-trisamides and mixtures thereof, and/or (b) present in the polymer composition (PC) in an amount between 0.1 wt.-% and 0.8 wt.-%, preferably between 0.15 wt.-% and 0.6 wt.-%, based on the total weight of the polymer composition (PC).

According to yet another preferred embodiment of the present invention, the adhesion promoter (AP) is a maleic anhydride modified polypropylene homo- or copolymer and/or an acrylic acid modified polypropylene homo- or copolymer, preferably a maleic anhydride modified polypropylene homopolymer and/or an acrylic acid modified polypropylene homopolymer and more preferably a maleic anhydride modified polypropylene homopolymer.

In the following the invention is described in more detail.

A cable having at least one insulation layer according to this invention comprises a polymer composition (PC) consisting of (a) at least 94 wt.-%, based on the total weight of the polymer composition (PC), of a crystalline polypropylene (PP) homo- or copolymer having a melt flow rate according to ISO 1133 (230° C./2.16 kg) in the range of 1 g/10 min to 10 g/10 min and a comonomer content of below 5 wt.-%, the comonomers are ethylene and/or a $C_4$ to $C_{10}$ α-olefin, (b) 0.5 wt.-% to 5 wt.-%, based on the total weight of the polymer composition (PC), of an adhesion promoter (AP) being a polar modified polypropylene (PM-PP) homo- or copolymer, and (c) 0.02 wt.-% to 1 wt.-%, based on the total weight of the polymer composition (PC), of a soluble α-nucleating agent (NA).

In a preferred embodiment the weight ratio of soluble α-nucleating agent (NA) to crystalline polypropylene (PP) homo- or copolymer [NA/PP] in the polymer composition (PC) is from 0.02/99.98 to 10.0/90.0, more preferably from 0.1/99.9 to 8.0/92.0, yet more preferably from 0.2/99.9 to 5.0/95.0

Furthermore, the polymer composition (PC) according to this invention is preferably featured by the fact that the soluble α-nucleating agent (NA) particles are dissolved in the melt of the crystalline polypropylene (PP) homo- or copolymer during melt-mixing and will recrystallize from said melt upon solidification. In other words, the crystalline polypropylene (PP) homo- or copolymer and the soluble α-nucleating agent (NA) particles do not form a mixture of separate particles (dry blends) but a microscale dispersion of recrystallized fibrils of the nucleating agent, said fibrils having a diameter of less than 0.25 μm, preferably less than 0.1 μm, measured according by transmission electron microscopy (TEM) or scanning (atomic) force microscopy (AFM). Examples for such determinations can be found in the literature, e.g. by Shepard et al., J. Polym. Sci. B: Polym. Phys. 35, p. 2617-2628 (1997) and by Lipp et al., Langmuir, 22, p. 6398-640 (2006).

The crystalline polypropylene (PP) homo- or copolymer of the polymer composition (PC) can be a polypropylene copolymer (C-PP) or a polypropylene homopolymer (H-PP), the latter being preferred.

If the crystalline polypropylene (PP) homo- or copolymer of the polymer composition (PC) is a polypropylene copolymer (C-PP), it is preferably a random polypropylene copolymer (R-PP).

The term random is understood according to IUPAC (Glossary of basic terms in polymer science; IUPAC recommendations 1996). Accordingly it is preferred that the random polypropylene copolymer (R-PP) has a randomness of at least 40%, more preferably of at least 50%, yet more preferably at least 55%, even more preferably of at least 60%, and still more preferably of at least 65%.

In case the polypropylene (PP1) is a random polypropylene copolymer (R-PP), it comprises monomers copolymerizable with propylene, for example comonomers such as ethylene and/or $C_4$ to $C_{10}$ α-olefins, in particular ethylene and/or $C_4$ to $C_8$ α-olefins, e.g. 1-butene and/or 1-hexene. Preferably the random polypropylene copolymer (R-PP) comprises, especially consists of, monomers copolymerizable with propylene from the group consisting of ethylene, 1-butene and 1-hexene. More specifically, the random polypropylene copolymer (R-PP) comprises—apart from propylene—units derivable from ethylene and/or 1-butene. In a preferred embodiment of the present invention, the random polypropylene copolymer (R-PP) comprises units derivable from ethylene and propylene only.

The comonomer content in the random polypropylene copolymer (R-PP) is preferably relatively low, i.e. below 5 wt.-%. In one preferred embodiment, the comonomer content is preferably between 0.1 wt.-% and 5 wt.-%, more preferably between 0.5 wt.-% and 4 wt.-%, even more preferably between 0.5 wt.-% and 3.5 wt.-% and most preferably between 1.0 wt.-% and 3.0 wt.-%, based on the total weight of the random polypropylene copolymer (R-PP).

In order to achieve the desired combination of processability and mechanical and electrical properties it is further preferred that the random polypropylene copolymer (R-PP) shall have a narrow to medium broad molecular weight distribution. More specifically, it is desired that the ratio of weight and number average molecular weight, $M_w/M_n$, as calculated from the molecular weight distribution determined by size exclusion chromatography according to ISO 16014 ranges from 2.2 to 6.0, preferably from 2.5 to 5.0.

The expression polypropylene homopolymer (H-PP) used in the instant invention relates to a polypropylene that consists substantially, i.e. of at least 99.5 wt.-%, more preferably of at least 99.8 wt.-%, of propylene units. In a preferred embodiment only propylene units in the polypropylene homopolymer (H-PP) are detectable.

As stated above it is in particular appreciated that the crystalline polypropylene (PP) homo- or copolymer is a polypropylene homopolymer (H-PP).

Preferably the polypropylene is isotactic. Accordingly it is appreciated that the polypropylene has a rather high isotactic triad concentration, i.e. higher than 90%, more preferably higher than 92%, still more preferably higher than 93% and yet more preferably higher than 95%, like higher than 97%.

In accordance with the present invention, the crystalline polypropylene (PP) homo- or copolymer is featured by a rather low melt flow rate.

The melt flow rate mainly depends on the average molecular weight. This is due to the fact that long molecules render the material a lower flow tendency than short molecules. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.).

Accordingly, the melt flow rate of the crystalline polypropylene (PP) homo- or copolymer according to ISO 1133 (230° C./2.16 kg) is in the range of 1 g/10 min to 10 g/10 min. For example, the crystalline polypropylene (PP) homo- or copolymer has a melt flow rate according to ISO 1133 (230° C./2.16 kg) in the range of 1 g/10 min to 8 g/10 min, more preferably in the range of 1 g/10 min to 6 g/10 min and most preferably in the range of 1 g/10 min to 4 g/10 min.

Accordingly it is preferred that the crystalline polypropylene (PP) homo- or copolymer has a weight average molecular weight (Mw) in the range of 40 to 900 kg/mol, more preferably in the range of 50 to 750 kg/mol.

Preferably, it is desired that the crystalline polypropylene (PP) homo- or copolymer is thermo-mechanically stable. Accordingly, it is appreciated that the crystalline polypropylene (PP) homo- or copolymer has a melting temperature Tm as determined by differential scanning calorimetry (DSC) of at least 140° C., more preferably at least 145° C. and most preferably at least 148° C. In one preferred embodiment, the crystalline polypropylene (PP) homo- or copolymer has a melting temperature Tm as determined by differential scanning calorimetry (DSC) in the range of 140° C. to 175° C. For example, the crystalline polypropylene (PP) homo- or copolymer has a melting temperature Tm in the range of 145° C. to 170° C. and most preferably in the range of 150° C. to 168° C.

Additionally or alternatively, the crystalline polypropylene (PP) homo- or copolymer is defined by the crystallization behavior. Accordingly, the crystalline polypropylene (PP) homo- or copolymer has a crystallization temperature Tc as determined by differential scanning calorimetry (DSC) of at least 105° C., more preferably at least 110° C. and most preferably at least 112° C. In one preferred embodiment, the crystalline polypropylene (PP) homo- or copolymer has a crystallization temperature Tc as determined by differential scanning calorimetry (DSC) in the range of 105° C. to 140° C. For example, the crystalline polypropylene (PP) homo- or copolymer has a crystallization temperature Tc in the range of 110° C. to 135° C. and most preferably in the range of 112° C. to 130° C.

The crystalline polypropylene (PP) homo- or copolymer can have a xylene cold soluble content (XCS) in a rather low amount, i.e. from 0.5 wt.-% to 8.5 wt.-% at 25° C. Accordingly the crystalline polypropylene (PP) homo- or copolymer may have a xylene cold soluble content (XCS) measured according to ISO 6427 from 0.8 wt.-% to 7.0 wt.-% and most preferably from 1.0 wt.-% to 6.0 wt.-%.

The amount of xylene cold solubles (XCS) additionally indicates that the crystalline polypropylene (PP) homo- or copolymer is preferably free of any elastomeric polymer component, like an ethylene propylene rubber. In other words, the crystalline polypropylene (PP) homo- or copolymer shall be not a heterophasic polypropylene, i.e. a system consisting of a polypropylene matrix in which an elastomeric phase is dispersed. Such systems are featured by a rather high xylene cold soluble content.

The polymer composition (PC) as defined in the instant invention may contain at least 94 wt.-% of the crystalline polypropylene (PP) homo- or copolymer, based on the total weight of the polymer composition (PC). For example, the polymer composition (PC) comprises the crystalline polypropylene (PP) homo- or copolymer in an amount of at least 95 wt.-%, preferably at least 96 wt.-%, more preferably at least 97 wt.-%, even more preferably at least 98 wt.-% and most preferably at least 99 wt.-%, e.g. equal to 99.5 wt.-%. Preferably, the polymer composition (PC) comprises the crystalline polypropylene (PP) homo- or copolymer in amounts of between 94 wt.-% and 99.5 wt.-%, preferably between 95 wt.-% and 99.5 wt.-%, and most preferably between 96 wt.-% and 99.4 wt.-%.

In accordance with the present invention, the polymer composition (PC) being part of the insulation layer further comprises an adhesion promoter (AP). The adhesion promoter (AP) is specified as being a polar modified polypropylene (PM-PP) homo- or copolymer.

The polar modified polypropylene (PM-PP) homo- or copolymer comprises a low molecular weight compound having reactive polar groups. Modified polypropylene homopolymers and copolymers, like copolymers of propylene and ethylene or with other α-olefins, e.g. $C_4$ to $C_{10}$ α-olefins, are most preferred, as they are highly compatible with the crystalline polypropylene (PP) homo- or copolymers of the inventive polymer composition (PC).

In terms of structure, the polar modified polypropylene (PM-PP) homo- or copolymer are preferably selected from graft homo- or copolymers.

In this context, preference is given to polar modified polypropylene (PM-PP) homo- or copolymers containing groups derived from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of said polar compounds are unsaturated cyclic anhydrides and their aliphatic diesters, and the diacid derivatives. In particular, one can use maleic anhydride and compounds selected from $C_1$ to $C_{10}$ linear and branched dialkyl maleates, $C_1$ to $C_{10}$ linear and branched dialkyl fumarates, itaconic anhydride, $C_1$ to $C_{10}$ linear and branched itaconic acid dialkyl esters, acrylic acid, maleic acid, fumaric acid, itaconic acid and mixtures thereof.

Particular preference is given to use a polypropylene homo- or copolymer grafted with maleic anhydride or acrylic acid as the polar modified polypropylene (PM-PP) homo- or copolymer, i.e. the adhesion promoter (AP).

The modified polymer, i.e. the adhesion promoter, can be produced in a simple manner by reactive extrusion of the polymer, for example with maleic anhydride or acrylic acid in the presence of free radical generators (like organic peroxides), as disclosed for instance in U.S. Pat. Nos. 4,506,056, 4,753,997 or EP 1 805 238.

Preferred amounts of groups derived from polar compounds in the polar modified polypropylene (PM-PP) homo- or copolymer, i.e. the adhesion promoter (AP), are from 0.5 wt.-% to 10 wt.-%. For example, in the range of 0.5 wt.-% to 8 wt.-%, preferable in the range of 0.5 wt.-% to 6 wt.-%, more preferably in the range of 0.5 wt.-% to 4 wt.-% and most preferably in the range of 0.5 wt.-% to 3.5 wt.-%.

Preferred values of the melt flow rate $MFR_2$ (230° C.) for the polar modified polypropylene (PM-PP) homo- or copolymer, i.e. for the adhesion promoter (AP), are from 2 to 500 g/10 min.

In one preferred embodiment of the present invention, the adhesion promoter (AP) is a maleic anhydride modified polypropylene homo- or copolymer and/or an acrylic acid modified polypropylene homo- or copolymer. Preferably, the adhesion promoter (AP) is a maleic anhydride modified polypropylene homopolymer and/or an acrylic acid modified polypropylene homopolymer and preferably a maleic anhydride modified polypropylene homopolymer. For example, suitable polar modified polypropylene (PM-PP) homo- or copolymers include, for example, a polypropylene homopolymer grafted with maleic anhydride (PP-g-MAH) and a polypropylene homopolymer grafted with acrylic acid (PP-g-AA).

The polymer composition (PC) as defined in the instant invention contains between 0.5 wt.-% and 5 wt.-%, preferably between 0.5 wt.-% and 3.5 wt.-%, and most preferably between 0.8 and 2.5 wt % polar modified polypropylene (PM-PP) homo- or copolymer.

The polymer composition (PC) being part of the insulation layer of the cable is further specified by the presence of a soluble α-nucleating agent (NA). Preferred soluble α-nucleating agent (NA)s are those which are soluble in the crystalline polypropylene (PP) homo- or copolymer, such as a polypropylene homopolymer (H-PP). Soluble α-nucleating agents (NA) are characterized by demonstrating a sequence of dissolution in heating and recrystallization in cooling to improve the degree of dispersion. Methods for determining said dissolution and recrystallization are described for example by Kristiansen et al. in Macromolecules 38 (2005) pages 10461-10465 and by Balzano et al. in Macromolecules 41 (2008) pages 5350-5355. In detail, the dissolution and recrystallization can be monitored by means of melt rheology in dynamic mode as defined by ISO 6271-10:1999.

Accordingly, it is preferred that the soluble α-nucleating agent (NA) is selected from the group consisting of sorbitol derivatives, nonitol derivatives, benzene-trisamides, and mixtures thereof.

Suitable sorbitol derivatives are di(alkylbenzylidene)sorbitols, like 1,3:2,4-dibenzylidenesorbitol or bis-(3,4-dimethylbenzylidene)sorbitol.

Suitable nonitol derivatives include 1,2,3-trideoxy-4,6:5,7-bis-O-[(4-propylphenyl)methylene]-nonitol, while suitable benzene-trisamides include substituted 1,3,5-benzenetrisamides, like N,N',N''-tris-tert-butyl-1,3,5-benzenetricarboxamide or N,N',N''-tris-cyclohexyl-1,3,5-benzene-tricarboxamide.

Especially preferred are di(alkylbenzylidene)sorbitols, like 1,3:2,4-dibenzylidenesorbitol or bis-(3,4-dimethylbenzylidene)sorbitol or nonitol derivatives, like 1,2,3-trideoxy-4,6:5,7-bis-O-[(4-propylphenyl)methylene]-nonitol.

In one preferred embodiment, the soluble α-nucleating agent (NA) is a nonitol derivative.

In one especially preferred embodiment, the soluble α-nucleating agent (NA) is 1,2,3-trideoxy-4,6:5,7-bis-O-[(4-propylphenyl)methylene]-nonitol.

The soluble α-nucleating agent (NA) is combined with the crystalline polypropylene (PP) homo- or copolymer and the adhesion promoter (AP) in a concentration between 200 and 10000 ppm by weight, preferably between 1000 and 8000 ppm by weight, more preferably between 1500 and 6000 ppm by weight and most preferably between 2000 and 5000 ppm by weight.

The above defined single components of the polymer composition (PC) are used as a part of at least one insulation layer of a cable.

Thus, in the following the properties of the polymer composition (PC) are defined in more detail.

The polymer composition (PC) being part of the insulation layer of the inventive cable comprises the crystalline polypropylene (PP) homo- or copolymer in an amount of at least 94 wt.-%, the adhesion promoter (AP) in an amount between 0.5 wt.-% and 5 wt.-% and the soluble α-nucleating agent (NA) in an amount between 0.02 wt.-% and 1 wt.-%, based on the total weight of the polymer composition (PC).

According to one preferred embodiment of the present invention, the polymer composition (PC) being part of the insulation layer of the cable comprises the crystalline polypropylene (PP) homo- or copolymer in an amount of at least 96.2 wt.-%, the adhesion promoter (AP) in an amount between 0.5 wt.-% and 3 wt.-% and the soluble α-nucleating agent (NA) in an amount between 0.1 wt.-% and 0.8 wt.-%, based on the total weight of the polymer composition (PC).

Alternatively, the polymer composition (PC) being part of the insulation layer of the cable comprises the crystalline polypropylene (PP) homo- or copolymer in an amount of at least 94.2 wt.-%, the adhesion promoter (AP) in an amount between 3 wt.-% and 5 wt.-% and the soluble α-nucleating agent (NA) in an amount between 0.1 wt.-% and 0.8 wt.-%, based on the total weight of the polymer composition (PC).

According to a further preferred embodiment of the present invention, the polymer composition (PC) being part of the insulation layer of the cable comprises the crystalline polypropylene (PP) homo- or copolymer in an amount of at least 96.9 wt.-%, the adhesion promoter (AP) in an amount between 0.5 wt.-% to 2.5 wt.-% and the soluble α-nucleating agent (NA) in an amount between 0.2 wt.-% to 0.6 wt.-%, based on the total weight of the polymer composition (PC).

Alternatively, the polymer composition (PC) being part of the insulation layer of the cable comprises the crystalline polypropylene (PP) homo- or copolymer in an amount of at least 94.4 wt.-%, the adhesion promoter (AP) in an amount between 3.5 wt.-% to 5 wt.-% and the soluble α-nucleating agent (NA) in an amount between 0.2 wt.-% to 0.6 wt.-%, based on the total weight of the polymer composition (PC).

According to a still further preferred embodiment of the present invention, the polymer composition (PC) being part of the insulation layer of the cable comprises the crystalline polypropylene (PP) homo- or copolymer in an amount of at least 97 wt.-%, the adhesion promoter (AP) in an amount between 0.5 wt.-% to 2.5 wt.-% and the soluble α-nucleating agent (NA) in an amount between 0.2 wt.-% to 0.5 wt.-%, based on the total weight of the polymer composition (PC).

Alternatively, the polymer composition (PC) being part of the insulation layer of the cable comprises the crystalline polypropylene (PP) homo- or copolymer in an amount of at least 94.5 wt.-%, the adhesion promoter (AP) in an amount between 3.5 wt.-% to 5 wt.-% and the soluble α-nucleating agent (NA) in an amount between 0.2 wt.-% to 0.5 wt.-%, based on the total weight of the polymer composition (PC).

For example, the polymer composition (PC) being part of the insulation layer of the cable comprises a crystalline polypropylene homopolymer (H-PP) in an amount of at least 94 wt.-%, the adhesion promoter (AP) in an amount between 0.5 wt.-% to 5 wt.-% and 0.02 wt.-% to 1 wt.-% of 1,3:2,4-bis-(3,4-dimethylbenzylidene)sorbitol (CAS No. 135861-56-2) as the soluble α-nucleating agent (NA), based on the total weight of the polymer composition (PC).

Alternatively, the polymer composition (PC) being part of the insulation layer of the cable comprises a crystalline polypropylene homopolymer (H—PP) in an amount of at least 94 wt.-%, the adhesion promoter (AP) in an amount between 0.5 wt.-% to 5 wt.-% and 0.02 wt.-% to 1 wt.-% of 1,2,3-trideoxy-4,6:5,7-bis-O-[(4-propylphenyl)methylene]-nonitol (CAS No. 882073-43-0) as the soluble α-nucleating agent (NA), based on the total weight of the polymer composition (PC).

Alternatively, the polymer composition (PC) being part of the insulation layer of the cable comprises a crystalline polypropylene homopolymer (H-PP) in an amount of at least 94 wt.-%, the adhesion promoter (AP) in an amount between 0.5 wt.-% to 5 wt.-% and 0.02 wt.-% to 1 wt.-% of N,N',N"-tris-tert-butyl-1,3,5-benzenetricarboxamide (CAS No. 745070-61-5) as the soluble α-nucleating agent (NA), based on the total weight of the polymer composition (PC).

In this context, it is appreciated that the weight ratio of crystalline polypropylene (PP) homo- or copolymer to adhesion promoter (AP) [PP/AP] in the polymer composition (PC) is from 99.5/0.5 to 94.0/5.0. For example, the weight ratio of crystalline polypropylene (PP) homo- or copolymer to adhesion promoter (AP) [PP/AP] in the polymer composition (PC) is from 99.5/0.5 to 97.0/3.0 and most preferably from 99.5/0.5 to 97.5/2.5. Alternatively, the weight ratio of crystalline polypropylene (PP) homo- or copolymer to adhesion promoter (AP) [PP/AP] in the polymer composition (PC) is from 97.0/3.0 to 95.0/5.0 and most preferably from 96.5/3.5 to 95.0/5.0.

Additionally or alternatively, the weight ratio of soluble α-nucleating agent (NA) to crystalline polypropylene (PP) homo- or copolymer [NA/PP] in the polymer composition (PC) is from 0.02/99.98 to 10.0/90.0, more preferably from 0.1/99.9 to 8.0/92.0, yet more preferably from 0.2/99.9 to 5.0/95.0.

Additionally or alternatively, the weight ratio of soluble α-nucleating agent (NA) to adhesion promoter (AP) [NA/AP] in the polymer composition (PC) is from 1/250 to 1.0/2.0, more preferably from 1.0/20.0 to 1.0/2.0 and most preferably from 1.0/15.0 to 1.0/1.0.

In one preferred embodiment, the polymer composition (PC) is preferably used for producing at least one insulation layer being part of a cable. Accordingly, it is preferred that the polymer composition (PC) has a melt flow rate MFR$_2$ (230° C.) measured according to ISO 1133 in the range of 1 g/10 min to 8 g/10 min, preferably in the range of Ito 8 g/10 min, more preferably in the range of Ito 6 g/10 min and most preferably in the range of Ito 4 g/10 min.

In one preferred embodiment, the polymer composition (PC) has a melt flow rate equal to the melt flow rate of the crystalline polypropylene (PP) homo- or copolymer. In one especially preferred embodiment, the polymer composition (PC) and the crystalline polypropylene (PP) homo- or copolymer have the same melt flow rate.

Thus, the crystalline polypropylene (PP) homo- or copolymer and the polymer composition (PC) fulfill the relation (1), preferably relation (1a)

$$0.8 \times MFR(PP) \leq MFR(PC) \leq 1.2 \times MFR(PP) \qquad (1)$$

$$0.9 \times MFR(PP) \leq MFR(PC) \leq 1.1 \times MFR(PP) \qquad (1a)$$

wherein MFR(PP) is the melt flow rate MFR$_2$ (230° C.) [g/10 min] measured according to ISO 1133 of the crystalline polypropylene (PP) homo- or copolymer, and MFR(PC) is the melt flow rate MFR$_2$ (230° C.) [g/10 min] measured according to ISO 1133 of the polymer composition (PC).

Preferably, the polymer composition (PC) has a Shore D hardness from 63 to 80. For example, the polymer composition (PC) being part of the insulation layer preferably has a Shore D hardness from 65 to 78 and most preferably from 67 to 75.

Preferably the polymer composition (PC) being part of the insulation layer has a melting temperature Tm as determined by differential scanning calorimetry (DSC) in the range of 140° C. to 175° C., more preferably in the range of 145° C. to 170° C. and most preferably in the range of 148° C. to 168° C.

In one preferred embodiment, the polymer composition (PC) has a melting temperature Tm as determined by differential scanning calorimetry (DSC) equal to the melting temperature of the crystalline polypropylene (PP) homo- or copolymer. For example, the crystalline polypropylene (PP) homo- or copolymer and the polymer composition (PC) fulfill the relation (2), preferably relation (2a)

$$0.8 \times Tm(PP) \leq Tm(PC) \leq 1.2 \times Tm(PP) \qquad (2)$$

$$0.9 \times Tm(PP) \leq Tm(PC) \leq 1.1 \times Tm(PP) \qquad (2a)$$

wherein Tm (PP) is the melting temperature Tm as determined by differential scanning calorimetry (DSC) of the crystalline polypropylene (PP) homo- or copolymer, and Tm (PC) is the melting temperature Tm as determined by differential scanning calorimetry (DSC) of the polymer composition (PC).

Additionally or alternatively, the polymer composition (PC) being part of the insulation layer has a crystallization temperature Tc as determined by differential scanning calorimetry (DSC) in the range of 110° C. to 140° C., preferably in the range of 115° C. to 135° C., even more preferably in the range of 120° C. to 135° C. and most preferably in the range of 125° C. to 135° C.

In one preferred embodiment, the polymer composition (PC) has a crystallization temperature Tc as determined by differential scanning calorimetry (DSC) above the melting temperature of the crystalline polypropylene (PP) homo- or copolymer. In one preferred embodiment, the polymer composition (PC) has a crystallization temperature Tc as determined by differential scanning calorimetry (DSC) that is at least 2° C. above the crystallization temperature of the crystalline polypropylene (PP) homo- or copolymer, more preferably at least 4° C. and most preferably at least 8° C.

Furthermore, it is appreciated that the xylene soluble content of the polymer composition (PC) is rather low. Accordingly the polymer composition (PC) being part of the insulation layer has a content of a fraction soluble in xylene at 25° C. from 0.5 wt.-% to 8.5 wt.-%, based on the total weight of the polymer composition (PC). Thus, a preferred range is 0.8 wt.-% to 7.0 wt.-% and most preferably 1.0 wt.-% to 6.0 wt.-%, based on the total weight of the polymer composition (PC).

It is a further advantage of the instant invention that the polymer composition (PC) provides an excellent quenching resistance. Preferably, the quenching resistance is above the quenching resistance determined for a polymer composition (PC) but without soluble α-nucleating agent (NA) and adhesion promoter (AP).

As stated above, the polymer composition (PC) being part of the insulation layer preferably comprises a polypropylene homopolymer as the crystalline polypropylene (PP) homo- or copolymer. That is to say, the polypropylene homopolymer relates to a polypropylene that consists substantially, i.e. of at least 99.5 wt.-%, more preferably of at least 99.8 wt.-%, of propylene units. In a preferred embodiment only propylene units in the polypropylene homopolymer (H-PP) are detectable.

Preferably, the melt flow rate according to ISO 1133 (230° C./2.16 kg) of the polymer composition (PC) comprising a polypropylene homopolymer (H-PP) as the crystalline polypropylene (PP) homo- or copolymer is in the range of 1 g/10 min to 8 g/10 min. For example, the melt flow rate according to ISO 1133 (230° C./2.16 kg) of said polymer composition (PC) is in the range of 1 g/10 min to 6 g/10 min and preferably in the range of 2 g/10 min to 4 g/10 min. In one preferred embodiment, the melt flow rate according to ISO 1133 (230° C./2.16 kg) of said polymer composition (PC) is in the range of 2.5 g/10 min to 3.5 g/10 min.

It is further appreciated that a polymer composition (PC) comprising a polypropylene homopolymer (H-PP) as the crystalline polypropylene (PP) homo- or copolymer features a melting temperature Tm as determined by differential scanning calorimetry (DSC) in the range of 150° C. to 180° C. and most preferably in the range of 155° C. to 175° C. In one preferred embodiment, said polymer composition (PC) has a melting temperature Tm in the range of 160° C. to 170° C.

Additionally or alternatively, a polymer composition (PC) comprising a polypropylene homopolymer as the crystalline polypropylene (PP) homo- or copolymer has a Shore D hardness from 65 to 80, preferably from 68 to 78 and most preferably from 68 to 75. In one preferred embodiment, said polymer composition (PC) has a Shore D hardness from 70 to 75.

In another preferred embodiment, the polymer composition (PC) being part of the insulation layer preferably comprises a polypropylene copolymer (C-PP) as the crystalline polypropylene (PP) homo- or copolymer. Preferably, the polymer composition (PC) being part of the insulation layer comprises a random polypropylene copolymer (R-PP) as the crystalline polypropylene (PP) homo- or copolymer.

If the polymer composition (PC) comprises a random polypropylene copolymer (R-PP) as the crystalline polypropylene (PP) homo- or copolymer, the copolymer comprises monomers copolymerizable with propylene, for example comonomers such as ethylene and/or $C_4$ to $C_{10}$ α-olefins, in particular ethylene and/or $C_4$ to $C_8$ α-olefins, e.g. 1-butene and/or 1-hexene. Preferably the random polypropylene copolymer (R-PP) comprises, especially consist of, monomers copolymerizable with propylene from the group consisting of ethylene, 1-butene and 1-hexene. More specifically the random propylene copolymer (R-PP) comprises—apart from propylene—units derivable from ethylene and/or 1-butene. In a preferred embodiment of the present invention, the random polypropylene copolymer (R-PP) comprises units derivable from propylene and ethylene only. In case the polymer composition (PC) comprises a random polypropylene copolymer (R-PP) as the crystalline polypropylene (PP) homo- or copolymer, the comonomer content in the polymer composition (PC) is preferably relatively low, i.e. from 0.1 wt.-% to 5 wt.-%, based on the total weight of the polymer composition (PC). In one preferred embodiment, the comonomer content in the polymer composition (PC) is preferably between 0.5 wt.-% and 4 wt.-%, more preferably between 0.5 wt.-% and 3 wt.-% and most preferably between 1 wt.-% and 3 wt.-%, based on the total weight of the polymer composition (PC).

The term random is understood according to IUPAC (Glossary of basic terms in polymer science; IUPAC recommendations 1996). Accordingly it is preferred that the random propylene copolymer (R-PP) has a randomness of at least 40%, more preferably of at least 50%, yet more preferably at least 55%, even more preferably of at least 60%, and still more preferably of at least 65%.

Preferably, the melt flow rate according to ISO 1133 (230° C./2.16 kg) of the polymer composition (PC) comprising a random polypropylene copolymer (R-PP) as the crystalline polypropylene (PP) homo- or copolymer is in the range of 1 g/10 min and 7 g/10 min. For example, the melt flow rate according to ISO 1133 (230° C./2.16 kg) of said polymer composition (PC) is in the range of 1 g/10 min and 5 g/10 min and more preferably in the range of 1 g/10 min and 3 g/10 min. In one preferred embodiment, the melt flow rate according to ISO 1133 (230° C./2.16 kg) of said polymer composition (PC) is in the range of 1.5 g/10 min and 2.5 g/10 min.

Preferably, the melting temperature ($T_m$) measured by differential scanning calorimetry (DSC) of the polymer composition (PC) comprising a random polypropylene copolymer (R-PP) as the crystalline polypropylene (PP) homo- or copolymer is in the range of 140° C. to 170° C. and more preferably in the range of 145° C. to 165° C. In one preferred embodiment, said polymer composition (PC) features a melting temperature ($T_m$) in the range of 150° C. to 160° C.

Furthermore, it is appreciated that the polymer composition (PC) comprising a random polypropylene copolymer (R-PP) as the crystalline polypropylene (PP) homo- or copolymer has a Shore D hardness from 63 to 77, preferably from 63 to 75 and more preferably from 65 to 72. In one preferred embodiment, said polymer composition (PC) has a Shore D hardness from 65 to 70.

In accordance with the present application, the insulation layer comprising the above described polymer composition (PC) is part of a cable.

In addition to said polymer composition (PC) comprising the specific crystalline polypropylene (PP) homo- or copolymer, adhesion promoter (AP) and soluble α-nucleating agent (NA) also commonly used additives like phenolic antioxidants phosphorus-containing antioxidants, C-radical scavengers, acid scavengers, UV-stabilisers, antistatic agents, slip agents, and antiblocking agents can be added to the insulation layer. These components are well known for the skilled person and may be used in the common amounts and are selected by the skilled person as they are required and according to the respective purpose for which the polymer composition (PC) shall be used. Accordingly, it is also understood that the sum of the weights of the polymer composition (PC) in the insulation layer does usually not exactly add up to 100 wt.-%, but somewhat less, depending upon the amount of additives, which—in total—do usually not exceed 5 wt.-%.

In one preferred embodiment of the present invention, the cable is an electrical cable, in particular a communication cable, comprising a conductor and at least one insulation layer which comprises the polymer composition (PC) as defined above. In another preferred embodiment, the cable is a communication cable, comprising one or more wires surrounded by at least one insulation layer, and the one wire or a bundle of the two or more wires is further surrounded by at least a jacketing layer which forms the outermost polymeric layer for protecting the one or more wires.

In this regard, a communication cable is a cable for transferring information signals like telecommunication cables or coaxial cables. A telecommunication cable comprises a plurality of telesingle wires each surrounded by an insulation layer. The number of telesingle wires may vary from a few in a data transmission cable to up to several thousands in telephone cables. All wires are surrounded by a common protective jacketing layer, which surrounds and protects the wire bundle.

Said cable preferably comprises a metal conductor, even more preferably a copper conductor, having a diameter of 0.30 to 0.80 mm, preferably of 0.35 to 0.75 mm, most preferably of 0.40 to 0.70 mm. The cable including the insulation layer will preferably have a diameter of 0.60 to 1.50 mm, more preferably of 0.65 to 1.30 mm, and most preferably of 0.69 to 1.10 mm.

The current invention also provides cables having excellent surface quality and adhesion quality.

Preferably, the inventive cable provides a strip force of 4.0 N or more, more preferably of 4.5 N or more and most preferably of 5.0 N or more. The strip force is defined to be the force needed to peel off a insulation layer formed of the insulating polymer composition (PC) in accordance with ASTM D 4565, part 19.

The cable can be prepared by known methods. In general, the process for producing a cable comprising the above polymer composition (PC) as part of an insulation layer comprises the steps of (a) forming the polymer composition (PC), (b) applying said polymer composition (PC) at a melt temperature of 180° C. to 280° C. on a conductor to form an insulation layer, and (c) producing the cable at a processing speed of 300 m/min to 3000 m/min.

Forming the polymer composition (PC) of step (a) is preferably achieved by mixing the crystalline polypropylene (PP) homo- or copolymer having a melt flow rate according to ISO 1133 (230° C./2.16 kg) in the range of 1 g/10 min to 10 g/10 min and a comonomer content of below 5 wt.-%, the comonomers are ethylene and/or a $C_4$ to $C_{10}$ α-olefin with 0.5 wt.-% to 5 wt.-%, based on the total weight of the polymer composition (PC) with adhesion promoter (AP) being a polar modified polypropylene (PM-PP) homo- or copolymer, and with 0.02 wt.-% to 1 wt.-%, based on the total weight of the polymer composition (PC), of a soluble α-nucleating agent (NA).

For mixing, a conventional compounding or blending apparatus, e.g. a Banbury mixer, a 2-roll rubber mill, Buss-co-kneader or a twin screw extruder may be used. The twin screw extruder may be co-rotating or counter-rotating, preferably co-rotating. In accordance with step (b) of the instant process, the formed polymer composition (PC) is applied on a conductor to form an insulation layer. Preferably, this is achieved by extruding said polymer composition (PC) onto the conductor. The temperatures and pressures used in the operation of the extruder are known in the art. Typically the temperature may be selected from the range of 180° C. to 280° C., preferably from the range of 200° C. to 250° C. The pressure used for extrusion is preferably between 50 bar and 700 bar and preferably between 200 bar and 500 bar. The polymer composition (PC) is passed through the extruder on the conductor at a processing speed of 300 m/min to 3000 m/min. Preferably, the polymer composition (PC) is passed through the extruder on the conductor at a processing speed of 500 m/min to 2000 m/min and more preferably at a processing speed of 600 m/min to 1800 m/min In one preferred embodiment, the conductor is pre-heated to a temperature of between 50° C. and 150° C.

According to a further aspect, the present invention provides the use of a soluble α-nucleating agent (NA) for increasing the crystallization temperature of a polymer composition (PC) being part of an insulation layer of a cable as defined above. According to another aspect, the present invention refers to the use of the above defined cable as communication cable and/or electrical cable.

Concerning further preferred embodiments of crystalline polypropylene (PP) homo- or copolymer, the adhesion promoter (AP), and the soluble α-nucleating agent (NA) being part of the polymer composition (PC) of the insulation layer, it is referred to the comments made above.

The present invention will now be described in further detail by the examples provided below.

EXAMPLES

1. Definitions/Measuring Methods

The following definitions of terms and determination methods apply for the above general description of the invention as well as to the below examples unless otherwise defined.

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the triad analysis the assignment is done according to the methods described in literature: (T. Hayashi, Y. Inoue, R. Chüjö, and T. Asakura, Polymer 29 138-43 (1988) and Chujo R, et al, Polymer 35 339 (1994).

The NMR-measurement was used for determining the mm triad concentration in a manner well known in the art.

Melting temperature Tm, crystallization temperature Tc: measured with TA Q2000 differential scanning calorimetry (DSC) on 5 to 10 mg samples. DSC is run according to ISO 11357/part 3/method C2 in a heat/cool/heat cycle with a scan rate of 10° C./min in the temperature range of +23 to +210° C. Crystallization temperature and enthalpy are determined from the cooling step, while melting temperature and melting enthalpy are determined from the second heating step Randomness In the FTIR measurements, films of 250-mm thickness were compression moulded at 225° C. and investigated on a Perkin-Elmer System 2000 FTIR instrument. The ethylene peak area (760-700 cm$^{-1}$) was used as a measure of total ethylene content. The absorption band for the structure -P-E-P- (one ethylene unit between propylene units), occurs at 733 cm$^{-1}$. This band characterizes the random ethylene content. For longer ethylene sequences (more than two units), an absorption band occurs at 720 cm$^{-1}$. Generally, a shoulder corresponding to longer ethylene runs is observed for the random copolymers. The calibration for total ethylene content based on the area and random ethylene (PEP) content based on peak height at 733 cm$^{-1}$ was made by $^{13}$C-NMR. (Thermochimica Acta, 66 (1990) 53-68).

Randomness=random ethylene(-P-E-P-)content/the total ethylene content×100%.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

MFR$_2$ (230° C.) is measured according to ISO 1133 (230° C., 2.16 kg load).

MFR$_2$ (190° C.) is measured according to ISO 1133 (190° C., 2.16 kg load).

Ethylene content is measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of absorption peaks 720 and 733 cm$^{-1}$ was measured with Perkin Elmer FTIR 1600 spectrometer. The method was calibrated by ethylene content data measured by $^{13}$C-NMR.

Content of any one of the C4 to C10 α-olefins is determined with $^{13}$C-NMR; literature: "IR-Spektroskopie für Anwender"; WILEY-VCH, 1997 and "Validierung in der Analytik", WILEY-VCH, 1997.

The xylene cold solubles (XCS, wt.-%): Content of xylene cold solubles (XCS) is determined at 23° C. according ISO 6427.

Shore D hardness is measured at 3 and 15 seconds according to ASTM D2240-05.

REact parameter: The materials were pressed into films and circular samples were punched out of the films with weight of ca. 2 mg. DSC runs were performed with heating rate of 20° C./min to the temperature of 210° C. which was kept constant for 10 minutes. The samples were then cooled with different cooling rates (3, 10, 30, 100° C./min) and the crystallization temperature at each cooling rate was recorded. The quenching resistance was evaluated with a phenomenological dimensionless parameter "REact" often related to activation energy, $E_{act}$, for various phenomena. This approach was first described by H. E. Kissinger in Journal of Research of the National Bureau of Standards 1956, volume 57, issue 4, page 217, equation 7, for the differential thermal analysis of kaolinite clays, and afterwards used also for polymer crystallization.

$$"REact" = -R^{-1}E_{act} = \frac{d\left[\ln\left(\frac{T'}{T_{cr}^2}\right)\right]}{d\left(\frac{1}{T_{cr}}\right)}$$

where T' is the cooling rate from the melt, T, is the crystallization temperature, R is the gas constant. This "REact" parameter was found to correlate well with the crystallization temperature at cooling rates in the order of 30° C./s, from DSC plots of crystallization temperature vs. cooling rate, as well as with the α phase crystalline content of cables as measured with the deconvolution of Wide Angle X-Ray Scattering patterns.

Surface quality: The final cable was assessed optically by an experienced person and ranked on a relative scale from 1 to 10, on which "1" stands for massive roughness going to the point of defects in the insulation layer while "10" stands for a perfectly smooth and homogeneous surface.

Strip force: ASTM D 4565, part 19 is used to measure insulation adhesion to the conductor. The samples are prepared according to the standard, cutting out a 130 mm long section of the insulated cable and removing the insulation until only a 25 mm long insulated section remains. The sample is conditioned for 16 h at ambient temperature at 50% relative atmospheric humidity. The bared conductor is then passed through a die plate or orifice having an aperture measuring 0.07 to 0.13 mm larger than the conductor until the shoulder of insulation rests on the die plate. Using a tensile testing setup with a load cell tension between the conductor and the die plate is applied and the force required to strip the remaining insulation from the wire is recorded. The maximal force is registered.

2. Polymers

DM55pharm is a polypropylene homopolymer having a melting temperature of 164° C., an XCS content of 2.0 wt % and an $MFR_2$ (230° C.) of 2.8 g/10 min, commercially available from Borealis Polyolefine GmbH, Austria.

"PP-R" is an experimental propylene-ethylene random copolymer which was produced based on the commercial Avant ZN M1 catalyst supplied by LyondellBasell, USA in combination with triethylaluminium as cocatalyst and cyclohexyl trimethoxy silane as external donor with an aluminium to donor ratio of 5 mol/mol. The polymerization was performed in a Borstar PP plant using one liquid-phase loop rector and two gas phase reactors. The resulting copolymer had an ethylene content of 2.0 wt %, an $MFR_2$ (230° C./2.16 kg) of 1.9 g/10 min, a melting temperature of 149° C. and an xylene cold soluble (XCS) content of 4.5 wt.-%. This polymer was mixed with 0.1 wt % of Irganox B225 (1:1-blend of Irganox 1010 (Pentaerythrityl-tetrakis(3-(3',5'-di-tert.butyl-4-hydroxytoluoyl)-propionate and tris (2,4-di-t-butylphenyl)phosphate) phosphite) of BASF AG, Germany) and 0.04 wt % synthetic hydrotalcite (DHT-4A supplied by Kisuma Chemicals, Netherlands) in a co-rotating twin-screw extruder (type: Coperion ZSK 57).

HE3366 is a high-density polyethylene polymer designed for data cable insulation having an $MFR_2$ (190° C.) of 0.8 g/10 min commercially available from Borealis Polyolefine GmbH, Austria.

HE4872 is a high-density polyethylene polymer composition comprising an adhesion promoter designed for data cable insulation having an $MFR_2$ (190° C.) of 0.9 g/10 min commercially available from Borealis Polyolefine GmbH, Austria.

BA110CF is a heterophasic polypropylene copolymer (C-PP) having an ethylene content of 8.5 wt.-%, a melting point of 166° C. and an $MFR_2$ (230° C.) of 0.85 g/10 min, commercially available from Borealis Polyolefine GmbH, Austria.

RB501BF is a propylene-ethylene random copolymer having an ethylene content of 4.2 wt.-%, a melting point of 140° C. and an $MFR_2$ (230° C.) of 1.9 g/10 min, commercially available from Borealis Polyolefine GmbH, Austria.

3. Nucleating Agent (NA)

Millad NX8000 is the soluble α-crystal nucleating agent (NA) 1,2,3-trideoxy-4,6:5,7-bis-O-[(4-propylphenyl)methylene]-nonitol (CAS No. 882073-43-0) commercially available from Miliken Co., USA. Millad NX8000 is used in an amount of 0.25 wt.-%, based on the total weight of the polymer composition (PC).

Talc is a commercially talcum "Steamic T1CA" available from Luzenac with a $d_{50}$ of 1.8 μm, a cutoff particle size ($d_{95}$) of 6.2 μm and a BET of 8.0 m²/g. Talc is used in amount of 1.0 wt.-%, based on the total weight of the polymer composition (PC).

4. Further Additives

All polypropylene types were specifically modified for cable insulation purposes by adding 0.1 wt.-% of the metal deactivator Lowinox MD 24 (N,N'-bis(3(3',5'-di-tert. butyl-4'-hydroxyphenyl)propionyl)hydrazine, CAS No. 32687-78-8, supplied by Chemtura Europe GmbH, CH) and 0.1 wt % of the sulfur stabilizer Lowinox DSTDP (Di-stearyl-thio-di-propionate, CAS No. 693-36-7, supplied by Chemtura Europe GmbH, CH).

5. Adhesion Promoter

The adhesion promoter (AP) is the maleic anhydride modified polypropylene homopolymer (PP-g-MAH) Exxelor P01050 having an MFR2 (230° C.) of 430 g/10 min and a maleic anhydride content of 0.75 wt % supplied by ExxonMobil Chemical, USA.

6. Polymer Composition (PC)s

All polymer composition (PC)s as listed in table 1 (for inventive and comparative polymer composition (PC)s based on propylene-ethylene random copolymers and polypropylene homopolymers) were prepared by melt compounding in a Coperion ZSK 57 twin screw extruder (screw diameter 57 mm, L/D ratio 40) at temperatures between 190° C. and 240° C.

7. Cable Processing

The polymer compositions of table 1 were extruded as insulation layer onto a copper wire conductor having a diameter of 0.53 mm with a single screw extruder and a standard wire coating extrusion head with die dimensions, extruder pressures and speeds as indicated in table 2. The conductor was pre-heated to a temperature of 100° C., the melt temperature was set to 220° C. and a final cable diameter of 0.93 mm was adjusted in all cases. Cooling of the cable was performed first with water of 25° C. in a spray-cooling setup having a length of 2 m and then with water of 15° C. in an immersion-cooling setup.

TABLE 1

Polymer compositions a

| | Polymer type | Nucleant | AP type | AP amount [wt.-%] | MFR 2.16 kg 190*/230° C. [g/10 min] |
|---|---|---|---|---|---|
| IE1 | DM55pharm | NX8000 | PP-g-MAH | 1.5 | 2.8 |
| IE2 | PP-R | NX8000 | PP-g-MAH | 1.5 | 2.0 |
| CE1 | HE3366 | — | — | — | 0.8* |
| CE2 | HE4872 | — | EMAA | 0.85 | 0.9* |
| CE3 | DM55pharm | — | — | — | 2.8 |
| CE4 | DM55pharm | talc | PP-g-MAH | 1.5 | 2.8 |
| CE5 | PP-R | — | — | — | 2.0 |
| CE6 | BA110CF | — | — | — | 0.8 |
| CE7 | RB501BF | — | — | — | 1.9 | b

| | DSC 10K/min | | REact parameter | C2 total wt.-% | Shore D |
|---|---|---|---|---|---|
| | Tm ° C. | Tc ° C. | | | |
| IE1 | 164 | 128 | 6169 | 0 | 71 |
| IE2 | 153 | 126 | 4806 | 2.0 | 67 |
| CE1 | 127 | 116 | n.a. | n.a. | 58 |
| CE2 | 127 | 117 | n.a. | n.a. | 58 |
| CE3 | 164 | 120 | 3963 | 0 | 70 |
| CE4 | 164 | 121 | 3981 | 0 | 71 |
| CE5 | 153 | 109 | 2856 | 2.0 | 65 |
| CE6 | 164 | 113 | 3910 | 8.5 | 62 |
| CE7 | 137 | 97 | 1998 | 4.2 | 59 |

AP adhesion promoter
(n.a.—not applicable)

TABLE 2

| | | Processing and cable characteristics | | | | | |
|---|---|---|---|---|---|---|---|
| | Polymer type (base) | Die geometry body length/ diameter [mm] | Extruder pressure [bar] | Line speed [m/min] | Screw speed [rpm] | Surface quality (1-10) | Strip force [N] |
| IE1 | DM55pharm | 30/1.00 | 317 | 1006 | 71 | 10 | 9.2 |
| IE2 | PP-R | 25/0.94 | 323 | 1031 | 61 | 10 | 9.8 |
| CE1 | HE3366 | 25/0.94 | 460 | 1010 | 49 | 9 | 5.5 |
| CE2 | HE4872 | 25/0.94 | 460 | 1025 | 54 | 10 | 9.0 |
| CE3 | DM55pharm | 25/0.94 | 360 | 1100 | 96 | 7 | 6.2 |
| CE4 | DM55pharm | 30/1.00 | 256 | 1036 | 58 | 5 | 7.0 |
| CE5 | PP-R | 25/0.94 | 415 | 1025 | 85 | 8 | 6.2 |
| CE6 | BA110CF | 25/0.94 | 417 | 964 | 86 | 2 | 3.8 |
| CE7 | RB501BF | 25/0.94 | 382 | 1005 | 61 | 5 | 2.6 |

The invention claimed is:

1. A cable having at least one insulation layer comprising a polymer composition (PC) consisting of:
   (a) at least 94 wt. %, based on the total weight of the polymer composition (PC), of a crystalline polypropylene (PP) homo- or copolymer having a melt flow rate according to ISO 1133 (230° C./2.16 kg) in the range of 1 g/10 min to 10 g/10 min and a comonomer content of below 5 wt. %, the comonomers are ethylene and/or a $C_4$ to $C_{10}$ α-olefin,
   (b) 0.5 wt. % to 3.5 wt. %, based on the total weight of the polymer composition (PC), of an adhesion promoter (AP) being a maleic anhydride modified polypropylene homo- or copolymer and/or an acrylic acid modified polypropylene homo- or copolymer, and
   (c) 0.1 wt. % to 0.8 wt. %, based on the total weight of the polymer composition (PC), of a soluble α-nucleating agent (NA) selected from the group consisting of sorbitol derivatives, nonitol derivatives, benzene-tris-amides and mixtures thereof;
   wherein the polymer composition (PC) has a melting temperature Tm as determined by differential scanning calorimetry (DSC) in the range of 140° C. to 175° C. and a crystallization temperature Tc as determined by differential scanning calorimetry (DSC) in the range of 105° C. to 140° C.

2. The cable according to claim 1, wherein the crystalline polypropylene (PP) homo- or copolymer has a melt flow rate according to ISO 1133 (230° C./2.16 kg) in the range of 1.0 g/10 min to 8.0 g/10 min.

3. The cable according to claim 1, wherein the crystalline polypropylene (PP) homo- or copolymer has a melting temperature Tm as determined by differential scanning calorimetry (DSC) in the range of 140° C. to 175° C.

4. The cable according to claim 1, wherein the crystalline polypropylene (PP) homo- or copolymer has a crystallization temperature Tc as determined by differential scanning calorimetry (DSC) in the range of 105° C. to 140° C.

5. The cable according to claim 1, wherein the polymer composition (PC) has a Shore D hardness from 63 to 80.

6. The cable according claim 1, wherein the polymer composition (PC) has a content of a fraction soluble in xylene at 25° C. from 0.5 wt. % to 8.5 wt. %, based on the total weight of the polymer composition (PC).

7. The cable according to claim 1, wherein the polymer composition (PC) has a melt flow rate according to ISO 1133 (230° C./2.16 kg) in the range of 1.0 g/10 min and 8.0 g/10 min.

* * * * *